US010886034B2

(12) United States Patent
Hagstrand et al.

(10) Patent No.: US 10,886,034 B2
(45) Date of Patent: Jan. 5, 2021

(54) CABLE WITH ADVANTAGEOUS ELECTRICAL PROPERTIES

(71) Applicant: BOREALIS AG, Vienna (AT)

(72) Inventors: Per-Ola Hagstrand, Stenungsund (SE); Villgot Englund, Gothenburg (SE); Johan Andersson, Risings Backa (SE); Virginie Eriksson, Stenungsund (SE); Annika Smedberg, Myggenäs (SE); Ulf Nilsson, Odsmal (SE); Karl Nielsen, Stenungsund (SE); Thomas Gkourmpis, Gothenburg (SE); Antonios Gitsas, Linz (AT); Mattias Andersson, Gothenburg (SE); Christian Müller, Gothenburg (SE)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 16/311,494

(22) PCT Filed: Jun. 20, 2017

(86) PCT No.: PCT/EP2017/065134
§ 371 (c)(1),
(2) Date: Dec. 19, 2018

(87) PCT Pub. No.: WO2017/220609
PCT Pub. Date: Dec. 28, 2017

(65) Prior Publication Data
US 2019/0326033 A1    Oct. 24, 2019

(30) Foreign Application Priority Data

Jun. 21, 2016    (EP) .................................... 16175585

(51) Int. Cl.
*H01B 9/00*       (2006.01)
*H01B 3/44*       (2006.01)
(Continued)

(52) U.S. Cl.
CPC .............. *H01B 3/441* (2013.01); *C08L 23/06* (2013.01); *H01B 9/027* (2013.01); *H01B 13/14* (2013.01);
(Continued)

(58) Field of Classification Search
CPC . H01B 7/02; H01B 7/04; H01B 11/02; H01B 11/04; H01B 13/02; H01B 13/04
(Continued)

(56) References Cited

U.S. PATENT DOCUMENTS

| 4,260,661 | A | 4/1981 | Walters et al. |
| 4,693,937 | A | 9/1987 | Wu et al. |

(Continued)

FOREIGN PATENT DOCUMENTS

| CN | 101824199 | 9/2010 |
| CN | 105061859 | 11/2015 |

(Continued)

OTHER PUBLICATIONS

China petrochemical product manual, Liu Bingyi, p. 344, China petrochemical press; Mar. 2000 and translation.
(Continued)

*Primary Examiner* — William H. Mayo, III
(74) *Attorney, Agent, or Firm* — Meunier Carlin & Curfman LLC

(57) ABSTRACT

A cable having one or more conductors surrounded by at least an inner semiconductive layer, an insulation layer and an outer semiconductive layer, in that order. The insulation layer has at least 90 wt % of a polymer composition, said polymer composition having 80.0 to 99.9 wt % of an LDPE homopolymer or copolymer; and 0.1 to 20.0 wt % of: an ultra-high molecular weight polyethylene having a Mw of at least 1,000,000; or a single site catalysed medium density polyethylene (MDPE) having a density of 925 to 940 kg/m³
(Continued)

or a single site catalysed linear low density polyethylene (LLDPE) having a density of 910 to 925 kg/m³.

17 Claims, 2 Drawing Sheets

(51) Int. Cl.
  *C08L 23/06* (2006.01)
  *H01B 9/02* (2006.01)
  *H01B 13/14* (2006.01)

(52) U.S. Cl.
  CPC ... *C08L 2203/202* (2013.01); *C08L 2203/206* (2013.01); *C08L 2205/025* (2013.01); *C08L 2205/03* (2013.01); *C08L 2207/066* (2013.01); *C08L 2207/068* (2013.01); *C08L 2314/06* (2013.01)

(58) Field of Classification Search
  USPC ............. 174/102 R, 102 SC, 110 R, 110 SC, 174/120 R, 121 R
  See application file for complete search history.

(56) References Cited

U.S. PATENT DOCUMENTS

| | | | |
|---|---|---|---|
| 4,797,323 A | 1/1989 | Wu et al. | |
| 4,824,883 A | 4/1989 | Walter et al. | |
| 5,036,034 A | 7/1991 | Ewen | |
| 6,326,422 B1 | 12/2001 | Horwatt | |
| 9,249,271 B2 | 2/2016 | Low | |
| 9,404,005 B2 | 8/2016 | Sutton et al. | |
| 10,208,196 B2 * | 2/2019 | Nilsson | C08L 23/06 |
| 2010/0163269 A1 | 7/2010 | Perego et al. | |
| 2010/0163273 A1 * | 7/2010 | Smedberg | C08K 5/14 174/110 SR |
| 2010/0193217 A1 * | 8/2010 | Laurenson | C08K 5/14 174/120 SR |
| 2010/0206607 A1 * | 8/2010 | Noyens | B82Y 10/00 174/102 SC |
| 2012/0273253 A1 * | 11/2012 | Nilsson | C08F 6/001 174/120 SC |
| 2013/0032376 A1 | 2/2013 | Fagrell et al. | |
| 2013/0037759 A1 * | 2/2013 | Svanberg | H01B 1/24 252/511 |
| 2013/0081854 A1 | 4/2013 | Englund et al. | |
| 2013/0164552 A1 | 6/2013 | Wang | |
| 2013/0175068 A1 | 7/2013 | Sutton et al. | |
| 2013/0175070 A1 | 7/2013 | Person et al. | |
| 2013/0186670 A1 | 7/2013 | Person | |
| 2013/0199817 A1 | 8/2013 | Nilsson et al. | |
| 2013/0260624 A1 | 10/2013 | Rastogi et al. | |
| 2013/0284486 A1 | 10/2013 | Nilsson et al. | |
| 2014/0377577 A1 | 12/2014 | Lee et al. | |
| 2014/0378602 A1 | 12/2014 | Walther et al. | |
| 2015/0159069 A1 * | 6/2015 | Ranganathan | C09K 5/14 174/110 A |
| 2015/0228376 A1 * | 8/2015 | Ranganathan | H01B 3/441 428/391 |
| 2015/0294755 A1 | 10/2015 | Zhou et al. | |
| 2015/0307679 A1 * | 10/2015 | Lee | C08J 9/0028 521/79 |
| 2015/0315401 A1 * | 11/2015 | Lee | C08L 23/06 385/100 |
| 2016/0194489 A1 | 7/2016 | Ho et al. | |
| 2016/0199906 A1 | 9/2016 | Walton et al. | |
| 2016/0311998 A1 * | 10/2016 | Uematsu | C08K 3/04 |
| 2017/0169920 A1 * | 6/2017 | Liu | H01B 1/24 |
| 2017/0327675 A1 | 11/2017 | Englund et al. | |
| 2017/0365378 A1 | 12/2017 | Kaga et al. | |

FOREIGN PATENT DOCUMENTS

| | | | | |
|---|---|---|---|---|
| CN | 105440395 | | 3/2016 | |
| EP | 0129368 | | 12/1984 | |
| EP | 0260130 | | 3/1988 | |
| EP | 0423101 | | 4/1991 | |
| EP | 0537130 | | 4/1993 | |
| EP | 0517868 | | 11/1995 | |
| EP | 2553015 | | 2/2013 | |
| JP | 0218811 | | 1/1990 | |
| JP | H05266723 | | 10/1993 | |
| JP | 2003308740 | | 10/2003 | |
| WO | 9308222 | | 4/1993 | |
| WO | 9613529 | | 5/1996 | |
| WO | 9728170 | | 8/1997 | |
| WO | 9846616 | | 10/1998 | |
| WO | 9849208 | | 11/1998 | |
| WO | 9856831 | | 12/1998 | |
| WO | 9912981 | | 3/1999 | |
| WO | 9919335 | | 4/1999 | |
| WO | 99/57190 | | 11/1999 | |
| WO | 0034341 | | 6/2000 | |
| WO | 03/051934 | | 6/2003 | |
| WO | 2011/113685 | | 9/2011 | |
| WO | 2011/113686 | | 9/2011 | |
| WO | WO 2011/113686 A | * | 9/2011 | ............... H01B 3/44 |
| WO | 2011128147 | | 10/2011 | |
| WO | 2012044523 | | 4/2012 | |
| WO | 2013060736 | | 5/2013 | |
| WO | 2014075727 | | 5/2014 | |
| WO | 2015090640 | | 6/2015 | |
| WO | 2016066619 | | 5/2016 | |

OTHER PUBLICATIONS

International Search report and Written Opinion issued for Application No. PCT/EP2017/065143, dated Nov. 20, 2017, 15 pages.
International Search report and Written Opinion issued for Application No. PCT/EP2017/065148, dated Aug. 28, 2017, 12 pages.
International Search report and Written Opinion issued for Application No. PCT/EP2017/065133, dated Sep. 4, 2017, 13 pages.
International Search report and Written Opinion issued for Application No. PCT/EP2017/065134, dated Aug. 23, 2017, 14 pages.
Annala, et al., "Compatibilization of Conductive Polyethylene/Polyaniline Blends", Macromol. Mater. Eng., 291(7): 848-857, 2006. doi:10.1002/mame.200600071.
Cote, et al., "PANI-LDPE composites: Effect of blending conditions", Polym Compos, 30(1): 22-28, 2008. doi:10.1002/pc.20523.
Zhang et al., "Dynamic mechanical properties of melt processable PANI-DBSA/LDPE Blends", Synthetic Metals, vol. 135-136, pp. 481-482, 2003.
Zhang et al., "Electrically conductive, melt-processed ternary blends of polyaniline/dodecylbenzene sulfonic acid, ethylene/vinyl acetate, and low-density polyethylene", Journal of Polymer Science Part B: Polymer Physics, 42(20): 3750-3758, 2004.
Database WPI Week 199347 Thomas Scientific, London, GB, AN 1993-371305 XP002764002.
Database WPI Week 200420 Thomas Scientific, London, GB, AN 2004-206790 XP002764003.
Office Action issued in co-pending U.S. Appl. No. 16/311,497, dated Sep. 11, 2019.
Parker, J. A., et al. "On high pressure crystallization and the characterization of linear low-density polyethylenes." Polymer 35.19 (1994): 4140-4145.
Encyclopedia of Polymer Science and Engineering vol. 6 1986 pp. 383-410.
Rklimesch Dlittmann Fo Mahling Encyclopedia of Materials Science and Technology 2001 Elsevier Science Ltd article Polyethylene High-pressure pp. 7181-7184.
J. Randall JMS—Rev. Macromol. Chem. Phys., C29(2&3), 201-317 (1989).

(56) References Cited

OTHER PUBLICATIONS

Olsson, Carl-Olof, et al. "Experimental Determination of DC conductivity for XLPE Insulation." Nordic Insul. Symp.(NORD-IS 09). 2009, 55-58.

* cited by examiner

CABLE WITH ADVANTAGEOUS ELECTRICAL PROPERTIES

This invention relates to the use of blends comprising low density polyethylene (LDPE) polymers in the insulation layers of cables, such as DC cables. In particular, the invention relates to the combination of LDPEs with low amounts of a secondary polymer selected from LLDPE, MDPE or UHMWPE in order to surprisingly enable the formation of cable insulation layers with remarkably low conductivity.

The blends of the invention can be used in crosslinked or non-crosslinked form, in the latter case avoiding the need for a crosslinking agent to be present and avoiding the need for a post crosslinking degassing procedure to remove crosslinking agent by-products.

Whether crosslinked or non-crosslinked, the conductivity of the resulting composition and hence the insulation layer is lower than the use of the corresponding LDPE alone.

BACKGROUND

Polyolefins produced in a high pressure (HP) process are widely used in demanding polymer applications where the polymers must meet high mechanical and/or electrical requirements. For instance in power cable applications, particularly in medium voltage (MV) and especially in high voltage (HV) and extra high voltage (EHV) cable applications, the electrical properties of the polymer composition used in the cable has significant importance. Furthermore, the electrical properties of importance may differ in different cable applications, as is the case between alternating current (AC) and direct current (DC) cable applications.

A typical power cable comprises a conductor surrounded, at least, by an inner semiconductive layer, an insulation layer and an outer semiconductive layer, in that order. The cables are commonly produced by extruding the layers on a conductor.

The polymer material in one or more of said layers is often crosslinked to improve e.g. heat and deformation resistance, creep properties, mechanical strength, chemical resistance and abrasion resistance. During the crosslinking reaction, crosslinks (bridges) are primarily formed. Crosslinking can be effected using e.g. a free radical generating compound which are typically incorporated into the layer material prior to the extrusion of the layer(s) on a conductor. After formation of the layered cable, the cable is then subjected to a crosslinking step to initiate the radical formation and thereby crosslinking reaction.

Peroxides are very commonly used as free radical generating compounds. The resulting decomposition products of peroxides may include volatile by-products which are often undesired, since e.g. may have a negative influence on the electrical properties of the cable. Therefore the volatile decomposition products such as methane are conventionally reduced to a minimum or removed after crosslinking and cooling step. Such removal step, generally known as a degassing step, is time and energy consuming causing extra costs. It will be appreciated that a cross-linked polyethylene material is thermosetting.

LDPE is also an ideal cable forming material from a cleanliness point of view. LDPE can be manufactured in very pure form without impurities. In contrast low pressure polymers often contains more gels and catalyst residues which can lead to defects in the cable.

In order to increase the power transmission capability of extruded high voltage direct current (HVDC) cables, the voltage needs to be increased. In HVDC cables, the insulation is heated by the leakage current. The heating is proportional to the insulation conductivity×voltage$^2$. Thus, if the voltage is increased, more heat will be generated. This may lead to thermal runaway followed by electric breakdown. Thus, in order to increase the power transmission capacity, insulation material with very low electrical conductivity is needed. In one embodiment, the voltage may be increased from today's highest level of 320 kV to 640 kV or more.

The present inventors have now investigated the possibility of reducing conductivity though combination of the LDPE with a secondary polymer. The secondary polymer however is typically one made using an olefin polymerisation catalyst and hence catalyst residue content might be high. This leads to a greater risk of mechanical breakdown compared to XLPE. Nevertheless, the inventors have surprisingly found that the combination of low amounts of single site MDPE or LLDPE and LDPE leads to remarkable conductivity reduction in thermoplastic and cross-linked insulation layers even at very low levels of polymer.

Thermoplastic LDPE offers several advantages as cable insulation compared to a thermosetting cross-linked PE. As the polymer is not cross-linked, there is no possibility of peroxide initiated scorch. In addition, no degassing step is required to remove peroxide decomposition products. The elimination of crosslinking and degassing steps can lead to faster, less complicated and more cost effective cable production. However, the absence of a cross-linked material can lead to a reduced temperature resistance and hence significant problems with creep. Thus, better thermomechanical properties are needed in order to provide a polymer material that can be used without crosslinking in a cable insulation layer.

The present inventors have now found that the combination of an LDPE with a low amount of a single site catalysed LLDPE, a single site catalyed MDPE or an UHMWPE material can provide a blend such as a thermoplastic blend which is ideally suited for cable manufacture. Surprisingly, these blends have much lower conductivity than the corresponding LDPE alone and do not suffer from dielectric breakdown.

The LDPE of use in the invention is not itself new and it has been previously proposed in the literature. Moreover, the possibility of using non cross-linked LDPE in the insulation layer of a cable is not new. In WO2011/113685, LDPE of density 922 kg/m$^3$ and MFR$_2$ 1.90 g/10 min is suggested for use in the insulation layer of a cable. WO2011/113685 also suggests using other polymers individually in the non crosslinked insulation layer of a cable.

In WO2011/113686, a blend of LDPE and HDPE is used to manufacture a cross-linked polymer composition that can be used in the insulation layer of a cable.

The inventors have now found that certain LDPEs can be combined with low amounts of LLDPE, MDPE or UHMWPE to form a blend which has excellent electrical properties. In particular, we have found that the blends of the invention offer remarkably low conductivity in both non crosslinked and crosslinked forms.

The blends are therefore ideal for use in the insulation layer in a direct current (DC) power cable and the blends enable cables that operate at voltages higher than possible today.

SUMMARY OF INVENTION

Thus viewed from one aspect the invention provides a cable comprising one or more conductors conductor surrounded by at least an inner semiconductive layer, an insulation layer and an outer semiconductive layer, in that order, wherein said insulation layer comprises at least 90 wt % of a polymer composition, said polymer composition comprising
(I) 80.0 to 99.9 wt % of an LDPE homopolymer or copolymer; and
(II) 0.1 to 20.0 wt % of:
  (i) an ultra-high molecular weight polyethylene having a Mw of at least 1,000,000; or
  (ii) a single site catalysed medium density polyethylene (MDPE) having a density of 925 to 940 kg/m³ or a single site catalysed linear low density polyethylene (LLDPE) having a density of 910 to 925 kg/m³.

In all embodiments of the invention it is preferred if the polymer composition of the insulation layer has a conductivity of 10 fS/m or less, preferably 5.0 fS/m or less, more preferably 2.0 fS/m or less when measured according to DC conductivity method as described under "Determination Method A".

In all embodiments of the invention it is preferred if the insulation layer has a conductivity of 10 fS/m or less, preferably 5.0 fS/m or less when measured according to DC conductivity method as described under "Determination Method A".

In all embodiment it is preferred if the conductivity of the polymer composition of the insulation layer is $1.0 \times 10^{-14}$ S/cm or less when measured according to DC conductivity method as described under "Determination Methods B".

Viewed from another aspect the invention provides a cable comprising one or more conductors surrounded by at least an inner semiconductive layer, a non-crosslinked insulation layer and an outer semiconductive layer, in that order, wherein said insulation layer comprises at least 90 wt % of a polymer composition, said polymer composition comprising
(I) 80.0 to 99.9 wt % of an LDPE homopolymer or copolymer preferably having a density of 927 to 940 kg/m³; and
(II) 0.1 to 20.0 wt % of an ultra-high molecular weight polyethylene having a Mw of at least 1,000,000.

In this embodiment it is preferred if the conductivity of the polymer composition of the insulation layer is $1.0 \times 10^{-14}$ S/cm or less when measured according to DC conductivity method as described under "Determination Methods B".

Preferably, the insulation layer in this embodiment is not crosslinked and hence the conductivity measurement is measured on the non crosslinked insulation layer.

Viewed from another aspect the invention provides a cable comprising one or more conductors surrounded by at least an inner semiconductive layer, a crosslinked insulation layer and an outer semiconductive layer, in that order, wherein said insulation layer comprises at least 90 wt % of a polymer composition, said polymer composition comprising
(I) 80.0 to 99.9 wt % of an LDPE homopolymer or copolymer; and
(II) 0.1 to 20.0 wt % of a single site catalysed medium density polyethylene (MDPE) having a density of 925 to 940 kg/m³ or a single site catalysed linear low density polyethylene (LLDPE) having a density of 910 to 925 kg/m³.

Viewed from another aspect the invention provides a cable comprising one or more conductors surrounded by at least an inner semiconductive layer, a non crosslinked insulation layer and an outer semiconductive layer, in that order, wherein said insulation layer comprises at least 90 wt % of a polymer composition, said polymer composition comprising
(I) 80.0 to 99.9 wt % of an LDPE homopolymer or copolymer; and
(II) 0.1 to 20.0 wt % of a single site catalysed linear low density polyethylene (LLDPE) having a density of 910 to 925 kg/m³.

Viewed from another aspect the invention provides a cable comprising one or more conductors conductor surrounded by at least an inner semiconductive layer, a crosslinked insulation layer and an outer semiconductive layer, in that order, wherein said insulation layer comprises at least 90 wt % of a polymer composition, said polymer composition comprising
(I) 80.0 to 99.9 wt % of an LDPE homopolymer or copolymer; and
(II) 0.1 to 20.0 wt % of a single site catalysed medium density polyethylene (MDPE) having a density of 925 to 940 kg/m³.

Preferably, the crosslinked or non-crosslinked polymer composition of the insulation layer in this embodiment has a conductivity of less than 5.0 fS/m, preferably less than 2.0 fS/m when measured according to DC conductivity method as described under "Determination Methods A".

Preferably, the crosslinked or non-crosslinked polymer composition of the insulation layer in this embodiment has a conductivity of 20 fS/m or less, such as 10 fS/m or less when measured according to DC conductivity method as described under "Determination Methods C".

Preferably, the crosslinked or non-crosslinked polymer composition of the insulation layer in this embodiment has a conductivity of 10 fS/m or less, such as 5.0 fS/m or less when measured according to DC conductivity method as described under "Determination Methods D".

In particular, the cable of the invention is a direct current (DC) power cable, preferably operating at or capable of operating at 320 kV or more, such as 650 kV or more.

Viewed from another aspect the invention provides a process for producing a cable comprising the steps of:
applying on one or more conductors, preferably by (co)extrusion, an inner semiconductive layer, an insulation layer and an outer semiconductive layer, in that order, wherein the insulation layer comprises a polymer composition as herein before defined, and optionally crosslinking the insulation layer.

Definitions

Wherever the term "molecular weight Mw" is used herein, the weight average molecular weight is meant. Wherever the term "molecular weight Mv" is used herein, the nominal viscosity molecular weight is meant.

Non cross-linked polymer compositions or cable layers are regarded as thermoplastic.

The polymer composition of the invention may also be referred to as a polymer blend herein. These terms are used interchangeably.

The low density polyethylene, LDPE, of the invention is a polyethylene produced in a high pressure process. Typically the polymerization of ethylene and optional further comonomer(s) in a high pressure process is carried out in the presence of an initiator(s). The meaning of the term LDPE is well known and documented in the literature. The term LDPE describes and distinguishes a high pressure polyethylene from polyethylenes produced in the presence of an olefin polymerisation catalyst. LDPEs have certain typical features, such as different branching architecture.

The term SSC means single site catalysed.

DETAILED DESCRIPTION OF INVENTION

The present invention requires the use of a particular polymer composition comprising low density polyethylene (LDPE) and low amounts of ultra-high molecular weight polyethylene (UHMWPE) or single site LLDPE/MDPE in the insulation layer of a cable, especially a power cable such as a direct current (DC) power cable. Unexpectedly, the combination of low amounts of UHMWPE or SSC MDPE/LLDPE with the LDPE enable the formation of an insulation layer that has reduced, i.e. low, electrical conductivity. "Reduced" or "low" electrical conductivity as used herein interchangeably means that the value obtained from the DC conductivity measurement as defined below under "Determination methods" is low, i.e. reduced. Low electrical conductivity is beneficial for minimising undesired heat formation in the insulation layer of a cable.

Moreover and unexpectedly, some of the polymer compositions of the invention and hence the insulation layer of the cable of the invention have low electrical conductivity without the need for crosslinking. Furthermore, the non-crosslinked insulation still possesses the mechanical properties needed for an insulation layer of a cable, preferably a DC power cable, such as low flex modulus, good tensile modulus, and good stress crack.

LDPE

The low density polyethylene, LDPE, of the invention is a polyethylene produced in a high pressure process. Typically the polymerization of ethylene and optional further comonomer(s) in a high pressure process is carried out in the presence of an initiator(s). The meaning of the term LDPE is well known and documented in the literature. The term LDPE describes and distinguishes a high pressure polyethylene from polyethylenes produced in the presence of an olefin polymerisation catalyst. LDPEs have certain typical features, such as different branching architecture.

The LDPE used in the composition of the invention may have a density of 915 to 940 $kg/m^3$, preferably 918 to 935 $kg/m^3$, especially 920 to 932 $kg/m^3$, such as about 922 to 930 $kg/m^3$.

The LDPE polymer of the invention may be one having a high density. The density of LDPE polymer is preferably 927 to 940 $kg/m^3$, preferably 928 to 935 $kg/m^3$, especially 929 to 932 $kg/m^3$, such as about 930 $kg/m^3$. In particular, when the polymer composition of the invention comprises the UHMWPE, the use of a "high density" LDPE, i.e. one of density 927 to 940 $kg/m^3$ is preferred.

The $MFR_2$ (2.16 kg, 190° C.) of the LDPE polymer is preferably from 0.05 to 30.0 g/10 min, more preferably is from 0.1 to 20 g/10 min, and most preferably is from 0.1 to 10 g/10 min, especially 0.1 to 5.0 g/10 min. In a preferred embodiment, the $MFR_2$ of the LDPE is 0.1 to 4.0 g/10 min, especially 0.5 to 4.0 g/10 min, especially 1.0 to 3.0 g/10 min.

Where the LDPE is one having a "high density", it is preferred if the $MFR_2$ is 0.1 to 2.0 g/10 min, especially 0.1 to 1.0 g/10 min.

The LDPE may have a tensile modulus (1 mm/min ISO527-2) of at least 300 MPa, such as at least 325 MPa. Values up to 600 MPa are possible.

The LDPE may have a flex modulus (ISO178) of at least 300 MPa, such as at least 320 MPa. Values up to 600 MPa are possible.

It is possible to use a mixture of LDPEs in the polymer composition of the invention however it is preferred if a single LDPE is used.

The LDPE may be a low density homopolymer of ethylene (referred herein as LDPE homopolymer) or a low density copolymer of ethylene with one or more comonomer(s) (referred herein as LDPE copolymer). The one or more comonomers of the LDPE copolymer are preferably selected from the polar comonomer(s), non-polar comonomer(s) or from a mixture of the polar comonomer(s) and non-polar comonomer(s). Moreover, said LDPE homopolymer or LDPE copolymer may optionally be unsaturated.

As a polar comonomer for the LDPE copolymer, comonomer(s) containing hydroxyl group(s), alkoxy group(s), carbonyl group(s), carboxyl group(s), ether group(s) or ester group(s), or a mixture thereof, can be used. More preferably, comonomer(s) containing carboxyl and/or ester group(s) are used as said polar comonomer. Still more preferably, the polar comonomer(s) of LDPE copolymer is selected from the groups of acrylate(s), methacrylate(s) or acetate(s), or any mixtures thereof.

If present in said LDPE copolymer, the polar comonomer(s) is preferably selected from the group of alkyl acrylates, alkyl methacrylates or vinyl acetate, or a mixture thereof. Further preferably, said polar comonomers are selected from $C_1$- to $C_6$-alkyl acrylates, $C_1$- to $C_6$-alkyl methacrylates or vinyl acetate. Still more preferably, said LDPE copolymer is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer, comonomer(s) other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomer(s) comprise, preferably consist of, mono-unsaturated (=one double bond) comonomer(s), preferably olefins, preferably alpha-olefins, more preferably $C_3$ to $C_{10}$ alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described below in relation to unsaturated LDPE copolymers.

If the LDPE polymer is a copolymer, it preferably comprises 0.001 to 35 wt.-%, still more preferably less than 30 wt.-%, more preferably less than 25 wt.-%, of one or more comonomer(s). Preferred ranges include 0.5 to 10 wt %, such as 0.5 to 5 wt % comonomer.

The LDPE polymer, may optionally be unsaturated, i.e. may comprise carbon-carbon double bonds (—C=C—). Preferred "unsaturated" LDPEs contains carbon-carbon double bonds/1000 carbon atoms in a total amount of at least 0.4/1000 carbon atoms. If a non-cross-linked LDPE is used in the final cable, then the LDPE is typically not unsaturated as defined above. By not unsaturated is meant that the C=C content is preferably less than 0.2/1000 carbon atoms, such as 0.1/1000 C atoms or less.

As well known, the unsaturation can be provided to the LDPE polymer by means of the comonomers, a low molecular weight (Mw) additive compound, such as a crosslinking booster, CTA or scorch retarder additive, or any combinations thereof. The total amount of double bonds means herein double bonds added by any means. If two or more above sources of double bonds are chosen to be used for providing the unsaturation, then the total amount of double bonds in the LDPE polymer means the sum of the double bonds present. Any double bond measurements are carried out prior to optional crosslinking.

The term "total amount of carbon-carbon double bonds" refers to the combined amount of double bonds which originate from vinyl groups, vinylidene groups and trans-vinylene groups, if present.

If an LDPE homopolymer is unsaturated, then the unsaturation can be provided e.g. by a chain transfer agent (CTA), such as propylene, and/or by polymerization conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is preferably an unsaturated LDPE copolymer of ethylene with at least one polyunsaturated comonomer, and optionally with other comonomer(s), such as polar comonomer(s) which is preferably selected from acrylate or acetate comonomer(s). More preferably an unsaturated LDPE copolymer is an unsaturated LDPE copolymer of ethylene with at least polyunsaturated comonomer(s).

The polyunsaturated comonomers suitable for the unsaturated second polyolefin (b) preferably consist of a straight carbon chain with at least 8 carbon atoms and at least 4 carbons between the non-conjugated double bonds, of which at least one is terminal, more preferably, said polyunsaturated comonomer is a diene, preferably a diene which comprises at least eight carbon atoms, the first carbon-carbon double bond being terminal and the second carbon-carbon double bond being non-conjugated to the first one. Preferred dienes are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the carbon-carbon double bonds, preferably to the total amount of the vinyl groups. Herein, when a compound which can also act as comonomer, such as propylene, is used as CTA for providing double bonds, then said copolymerisable comonomer is not calculated to the comonomer content.

If LDPE polymer is unsaturated, then it has preferably a total amount of carbon-carbon double bonds, which originate from vinyl groups, vinylidene groups and trans-vinylene groups, if present, of more than 0.4/1000 carbon atoms, preferably of more than 0.5/1000 carbon atoms. The upper limit of the amount of carbon-carbon double bonds present in the polyolefin is not limited and may preferably be less than 5.0/1000 carbon atoms, preferably less than 3.0/1000 carbon atoms.

In some embodiments, e.g. wherein higher crosslinking level with the low peroxide content is desired, the total amount of carbon-carbon double bonds, which originate from vinyl groups, vinylidene groups and trans-vinylene groups, if present, in the unsaturated LDPE, is preferably higher than 0.40/1000 carbon atoms, preferably higher than 0.50/1000 carbon atoms, preferably higher than 0.60/1000 carbon atoms.

If the LDPE is unsaturated LDPE as defined above, it contains preferably at least vinyl groups and the total amount of vinyl groups is preferably higher than 0.05/1000 carbon atoms, still more preferably higher than 0.08/1000 carbon atoms, and most preferably of higher than 0.11/1000 carbon atoms. Preferably, the total amount of vinyl groups is of lower than 4.0/1000 carbon atoms. More preferably, the second polyolefin (b), prior to crosslinking, contains vinyl groups in total amount of more than 0.20/1000 carbon atoms, still more preferably of more than 0.30/1000 carbon atoms.

It is however, preferred if the LDPE of the invention is not unsaturated and possesses less than 0.2 C=C/1000 C atoms, preferably less than 0.1 C=C/1000 C atoms.

It is preferred if the LDPE is a homopolymer. If the insulation layer is not crosslinked it is particularly preferred if the LDPE is a homopolymer. If the insulation layer is crosslinked then the LDPE can be an LDPE copolymer.

The LDPE polymer may have a high melting point, which may be of importance especially for a thermoplastic insulation material. Melting points of 112° C. or more are envisaged, such as 114° C. or more, especially 116° C. or more, such as 112 to 125° C. Such high melting point LDPEs may be used in conjunction with the UHMWPE in particular.

The LDPE polymer is produced at high pressure by free radical initiated polymerisation (referred to as high pressure (HP) radical polymerization). The HP reactor can be e.g. a well-known tubular or autoclave reactor or a mixture thereof, preferably a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

After the separation the obtained LDPE is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

When an unsaturated LDPE copolymer of ethylene is prepared, then, as well known, the carbon-carbon double bond content can be adjusted by polymerising the ethylene e.g. in the presence of one or more polyunsaturated comonomer(s), chain transfer agent(s), or both, using the desired feed ratio between monomer, preferably ethylene, and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers. As a result the unsaturation can be uniformly distributed along the polymer chain in random copolymerisation manner.

The polymer composition of the invention preferably comprises 81.0 to 99.5 wt %, such as 82.0 to 99.0 wt % of the LDPE. Preferably, the composition comprises 84.0 to 99.0 wt %, such as 85.0 to 98.0 wt % of the LDPE, more preferably 85.0 to 98.0 wt % of LDPE.

UHMW PE

The composition of the invention may comprise an UHMWPE component. This might be an ethylene copolymer or an ethylene homopolymer. It is preferred if the UHMWPE is a homopolymer.

It is generally observed that increasing molecular weight is important for better dimensional stability (i.e. resistance to creep). The exceptional dimensional stability formed with higher molecular weight might originate from the increased probability of tie chain formation and high melt viscosity of the UHMWPE.

UHMW Copolymer Component

The composition of the invention may comprise a component (II) which is an UHMW polyethylene copolymer component. The use of an UHMWPE copolymer may be advantageous since they introduce tie chains between crystals and therefore improve creep properties. This may be present in an amount of 0.5 to 19.0 wt %, such as 1.0 to 18.0 wt %, such as 1.0 to 16.0 wt %, preferably 2.0 to 15.0 wt %. In particular where the UHMWPE is present, the amount may be 4.0 to 15.0 wt %, preferably 4.0 to 12.0 wt % of the blend, especially 4.0 to 11.0 wt %. Amounts of LDPE present can be such to add to 100%.

The comonomer present in this component is at least one C3-20 olefin. Preferred comonomers are alpha-olefins, especially with 3-8 carbon atoms. Preferably, the comonomer is selected from the group consisting of propene, 1-butene, 1-hexene, 4-methyl-1-pentene, 1-octene, 1,7-octadiene and 7-methyl-1,6-octadiene. The use of 1-hexene or 1-butene is most preferred. Ideally only one comonomer is present. The use of hexene is especially preferred.

The comonomer content is preferably between 0.5 to 3 mol %. The amount of comonomer is generally tailored so as to achieve the intrinsic viscosity as required in the invention.

The UHMW polyethylene copolymer component of the blends of the invention preferably has a nominal viscosity molecular weight (Mv) of at least 1,000,000 g/mol, preferably at least 1,500,000 g/mol, more preferably at least 2,000,000 g/mol. In all embodiments, it is preferred if the UHMW polyethylene has a Mv of less than 10,000,000 g/mol, even more preferably less than 9,000,000 g/mol.

The UHMW polyethylene copolymer component of the blends of the invention preferably has a weight average molecular weight (Mw) of at least 1,000,000 g/mol, preferably at least 1,500,000 g/mol, more preferably at least 2,000,000 g/mol. In all embodiments, it is preferred if the UHMW polyethylene has a Mw of less than 12,000,000 g/mol, even more preferably less than 10,000,000 g/mol. A particularly preferred range is 3,000,000 to 10,000,000, such as 4,000,000 to 9,000,000 g/mol.

The UHMWPE copolymer may have a viscosity number of 1500 to 4500 (ISO1628-3), preferably 2000 to 4000.

The UHMW PE copolymer component preferably has an intrinsic viscosity of at least 7 dl/g, preferably at least 9 dl/g, such as at least 12 dl/g, even at least 14 dl/g. The intrinsic viscosity of the UHMWPE copolymer component should preferably not exceed 30 dl/g, more preferably not exceed 28 dl/g. It will be appreciated that intrinsic viscosity is a measure of molecular weight in this field.

The UHMWPE copolymer component is also preferably unimodal. This means that it has a single peak on GPC. Ideally it is formed from a single component and is therefore produced in a single manufacturing step.

The density of the UHMWPE copolymer component can be in the range 900 to 930 kg/m$^3$, preferably 905 to 925 kg/m$^3$.

This component has a very low MFR, such as an $MFR_{21}$ of less than 0.5 g/10 min, especially $MFR_{21}$ of less than 0.1 g/10 min, more especially less than 0.05 g/10 min.

The UHMW copolymer component can be made using Ziegler Natta catalysis, e.g. using vanadium tetrachloride. The UHMW copolymer is typically produced in the gas phase in the absence of hydrogen to ensure high Mw. For gas phase reactors, the reaction temperature used will generally be in the range 60 to 115° C., e.g. 70 to 110° C., the reactor pressure will generally be in the range 10 to 25 bar, and the residence time will generally be 1 to 8 hours. The UHMWPE copolymers are commercially available polymers.

UHMW Homopolymer Component

The composition of the invention may instead comprise a UHMW polyethylene homopolymer component. This may be present in an amount of 0.5 to 19.0 wt %, such as 1.0 to 18.0 wt %, such as 1.0 to 16.0 wt %, preferably 2.0 to 15.0 wt %. In particular where the UHMWPE is present, the amount may be 4.0 to 15.0 wt %, preferably 4.0 to 12.0 wt % of the blend, especially 4.0 to 11.0 wt %. Amounts of LDPE present can be such to add to 100%.

The UHMW polyethylene homopolymer has a nominal viscosity molecular weight (Mv) of at least 1,000,000 g/mol, preferably at least 1,500,000 g/mol, more preferably at least 2,000,000 g/mol. In all embodiments, it is preferred if the UHMW polyethylene has a Mv of less than 8,000,000 g/mol, even more preferably less than 7,000,000 g/mol.

The UHMW polyethylene homopolymer component of the blends of the invention preferably has a nominal viscosity molecular weight (Mv) of at least 1,000,000 g/mol, preferably at least 1,500,000 g/mol, more preferably at least 2,000,000 g/mol. In all embodiments, it is preferred if the UHMW polyethylene homopolymer has a Mv of less than 10,000,000 g/mol, even more preferably less than 9,000,000 g/mol.

The UHMW polyethylene homopolymer component of the blends of the invention preferably has a weight average molecular weight (Mw) of at least 1,000,000 g/mol, preferably at least 1,500,000 g/mol, more preferably at least 2,000,000 g/mol. In all embodiments, it is preferred if the UHMW polyethylene homopolymer has a Mw of less than 12,000,000 g/mol, even more preferably less than 10,000,000 g/mol. A particularly preferred range is 3,000,000 to 10,000,000, such as 4,000,000 to 9,000,000 g/mol.

The UHMWPE homopolymer may have a viscosity number of 1500 to 4500 (ISO1628-3), preferably 2000 to 4000.

The UHMW PE homopolymer component preferably has an intrinsic viscosity of at least 7 dl/g, preferably at least 9 dl/g, such as at least 12 dl/g, even at least 14 dl/g. The intrinsic viscosity of the UHMWPE homopolymer component should preferably not exceed 30 dl/g, more preferably not exceed 28 dl/g. It will be appreciated that intrinsic viscosity is a measure of molecular weight in this field.

The UHMW polyethylene homopolymer component is preferably unimodal. This means that it has a single peak on GPC. Ideally it is formed from a single component and is therefore produced in a single manufacturing step.

The density of the UHMW homopolymer component can be in the range 920 to 960 kg/m$^3$, preferably 930 to 950 kg/m$^3$.

This component has a very low MFR, such as an $MFR_{21}$ of less than 0.5 g/10 min, especially $MFR_{21}$ of less than 0.1 g/10 min, more especially less than 0.05 g/10 min.

The UHMWPE homopolymer component can be made using Ziegler Natta catalysis, e.g. using vanadium tetrachloride. The UHMW homopolymer is typically produced in the gas phase in the absence of hydrogen to ensure high Mw. For gas phase reactors, the reaction temperature used will generally be in the range 60 to 115° C., e.g. 70 to 110° C., the reactor pressure will generally be in the range 10 to 25 bar, and the residence time will generally be 1 to 8 hours. These homopolymers are commercially available polymers, e.g. from DSM.

The UHMWPE can be combined with the LDPE for use in crosslinked or non-crosslinked insulation layers, preferably non-crosslinked. In either embodiment, it is preferred if the conductivity of the polymer composition of the insulation layer is $1.0 \times 10^{-14}$ S/cm or less when measured according to DC conductivity method as described under "Determination Methods B". More preferably, the conductivity of the polymer composition of the insulation layer is $9.0 \times 10^{-15}$ S/cm or less when measured according to DC conductivity method as described under "Determination Methods B", such as $5.0 \times 10^{-15}$ S/cm or less.

LLDPE or MDPE

In a further embodiment the LDPE of the invention is combined with an LLDPE or an MDPE produced using a single site catalyst. Moreover, it is preferred if the blend of LDPE and LLDPE/MDPE is without an acid scavenger. In this embodiment, it is preferred if the insulation layer is crosslinked, especially when the polymer is an MDPE.

This MDPE or LLDPE may be present in an amount of 0.5 to 19.0 wt %, such as 1.0 to 18.0 wt %, such as 1.0 to 16.0 wt %, preferably 2.0 to 15.0 wt %. Where an MDPE is used, preferred amounts are 4.0 to 15.0 wt %, preferably 4.0 to 12.0 wt % of the blend, especially 5.0 to 10.0 wt %. Where an LLDPE is used, further preferred amounts are 1.5 to 6 wt %, especially 2.0 to 5.0 wt %. The amount of LDPE can be adjusted to sum to 100%.

LLDPEs of the invention have a density of 910 kg/m³ to 925 kg/m³. Ideally the polymer will have a density of at least 912 kg/m³. A preferred density range may be 912-922 kg/m³, especially 915 to 921 kg/m³. This density is made possible by the single-site catalysed polymerisation of the ethylene polymer and has several advantages.

MDPEs of the invention have a density of 925 kg/m³ to 940 kg/m³. Ideally the polymer will have a density of at least 928 kg/m³. A preferred density range may be 928-938 kg/m³, especially 930 to 937 kg/m³. This density is made possible by the single-site catalysed polymerisation of the ethylene polymer and has several advantages.

The MDPE or LLDPE polymer of the invention preferably has a $MFR_{21}$ of 5-50 g/10 min, more preferably 10 to 40 g/10 min, especially 20 to 35 g/10 min. $MFR_2$ values may range from 0.1 to 10.0 g/10 min, such as 0.5 to 5 g/10 min. Ideally the $MFR_2$ value is in the range 0.5 to 3 g/10 min.

The SSC ethylene polymers of the invention preferably have molecular weight, Mw, of at least 80,000, preferably at least 100,000. Very high Mw is not favoured. Mw should not be greater than 250,000, e.g. no more than 200,000.

The Mw/Mn is dependent on modality but may range from 2 to 12, such as 2 to 10, e.g. 2 to 5.

The LLDPE or MDPE of the invention may be unimodal or multimodal. The term "multimodal" means herein, unless otherwise stated, multimodality with respect to molecular weight distribution and includes therefore a bimodal polymer. Usually, a polyethylene composition, comprising at least two polyethylene fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

A unimodal polymer, unless otherwise stated, is unimodal with respect to molecular weight distribution and therefore contains a single peak on is GPC curve.

The MDPE/LLDPE is a copolymer and can therefore be formed from ethylene with at least one other comonomer, e.g. $C_{3-20}$ olefin. Preferred comonomers are alpha-olefins, especially with 3-8 carbon atoms. Preferably, the comonomer is selected from the group consisting of propene, 1-butene, 1-hexene, 4-methyl-1-pentene, 1-octene, 1,7-octadiene and 7-methyl-1,6-octadiene. The use of 1-hexene or 1-butene is most preferred.

The polymer can comprise one monomer or two monomers or more than 2 monomers. The use of a single comonomer is preferred. If two comonomers are used it is preferred if one is an $C_{3-8}$ alpha-olefin and the other is a diene as hereinbefore defined.

The amount of comonomer is preferably such that it comprises 0-3 mol %, more preferably 0.5-3.0 mol % of the LLDPE/MDPE. Values under 1.0 mol % are also envisaged, e.g. 0.1 to 1.0 mol %. These can be determined by NMR.

The LLDPE or MDPE polymer of the invention is prepared by single-site catalysed polymerisation. The use of a single-site catalysed ethylene polymer gives better conductivity, than for example a Ziegler Natta based catalyst. Further, the use of single site catalysed polymer allows a lower amount of crosslinking agent to be used to reach the desired degree of crosslinking than for example a Ziegler Natta based catalyst. More importantly, the SSC PE is a "cleaner" polymer meaning there is less impurity in the cable and less chance of defects. The LLDPE or MDPE as defined above may be made using any conventional single site catalysts, including metallocenes and non-metallocenes as well known in the field.

Preferably said catalyst is one comprising a metal coordinated by one or more η-bonding ligands. Such η-bonded metals are typically transition metals of Group 3 to 10, e.g. Zr, Hf or Ti, especially Zr or Hf. The η-bonding ligand is typically an $\eta^5$-cyclic ligand, i.e. a homo or heterocyclic cyclopentadienyl group optionally with fused or pendant substituents. Such single site, preferably metallocene, procatalysts have been widely described in the scientific and patent literature for about twenty years. Procatalyst refers herein to said transition metal complex.

The metallocene procatalyst may have a formula II:

$$(Cp)_m R_n MX_q \quad (II)$$

wherein:

each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand;

the optional one or more substituent(s) being independently selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, C6-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR"$_3$, —SR", —PR"$_2$ or —NR"$_2$, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom to which they are attached;

R is a bridge of 1-7 atoms, e.g. a bridge of 1-4 C-atoms and 0-4 heteroatoms, wherein the heteroatom(s) can be e.g. Si, Ge and/or O atom(s), wherein each of the bridge atoms may bear independently substituents, such as $C_{1-20}$-alkyl, tri($C_{1-20}$-alkyl)silyl, tri($C_{1-20}$-alkyl)siloxy or $C_{6-20}$-aryl substituents); or a bridge of 1-3, e.g. one or two, hetero atoms, such as silicon, germanium and/or oxygen atom(s), e.g. —SiR$^1$$_2$—, wherein each R$^1$ is independently $C_{1-20}$-alkyl, $C_{6-20}$-aryl or tri($C_{1-20}$-alkyl)silyl-residue, such as trimethylsilyl;

M is a transition metal of Group 3 to 10, preferably of Group 4 to 6, such as Group 4, e.g. Ti, Zr or Hf, especially Hf;

each X is independently a sigma-ligand, such as H, halogen, $C_{1-20}$-alkyl, $C_{1-20}$-alkoxy, $C_2$-$C_{20}$-alkenyl, $C_2$-$C_{20}$-alkynyl, C3-C12-cycloalkyl, $C_6$-$C_{20}$-aryl, $C_6$-$C_{20}$-aryloxy, $C_7$-$C_{20}$-arylalkyl, C7-C20-arylalkenyl, —SR", —PR"$_3$, —SiR"$_3$, —OSiR"$_3$, —NR"$_2$ or —CH$_2$—Y, wherein Y is C6-C20-aryl, C6-C20-heteroaryl, C1-$C_{20}$-alkoxy, C6-C20-aryloxy, NR"$_2$, —SR", —PR"$_3$, —SiR"$_3$, or —OSiR"$_3$;

each of the above mentioned ring moieties alone or as a part of another moiety as the substituent for Cp, X, R" or R1 can further be substituted e.g. with C1-C20-alkyl which may contain Si and/or O atoms;

n is 0, 1 or 2, e.g. 0 or 1,
m is 1, 2 or 3, e.g. 1 or 2,
q is 1, 2 or 3, e.g. 2 or 3,
wherein m+q is equal to the valency of M.

Suitably, in each X as —CH$_2$—Y, each Y is independently selected from C6-C20-aryl, NR"$_2$, —SiR"$_3$ or —OSiR"$_3$. Most preferably, X as —CH$_2$—Y is benzyl. Each X other than —CH$_2$—Y is independently halogen, C1-C20-alkyl, C1-C20-alkoxy, C6-C20-aryl, C7-C20-arylalkenyl or —NR"$_2$ as defined above, e.g. —N(C1-C20-alkyl)$_2$.

Preferably, q is 2, each X is halogen or —CH$_2$—Y, and each Y is independently as defined above.

Cp is preferably cyclopentadienyl, indenyl, tetrahydroindenyl or fluorenyl, optionally substituted as defined above.

In a suitable subgroup of the compounds of formula II, each Cp independently bears 1, 2, 3 or 4 substituents as defined above, preferably 1, 2 or 3, such as 1 or 2 substituents, which are preferably selected from C1-C20-alkyl, C6-C20-aryl, C7-C20-arylalkyl (wherein the aryl ring alone or as a part of a further moiety may further be substituted as indicated above), —OSiR"$_3$, wherein R" is as indicated above, preferably C1-C20-alkyl.

R, if present, is preferably a methylene, ethylene or a silyl bridge, whereby the silyl can be substituted as defined above, e.g. a (dimethyl)Si=, (methylphenyl)Si= or (trimethylsilylmethyl)Si=; n is 0 or 1; m is 2 and q is two. Preferably, R" is other than hydrogen.

A specific subgroup includes the well known metallocenes of Zr, Hf and Ti with two η-5-ligands which may be bridged or unbridged cyclopentadienyl ligands optionally substituted with e.g. siloxy, or alkyl (e.g. C1-6-alkyl) as defined above, or with two unbridged or bridged indenyl ligands optionally substituted in any of the ring moieties with e.g. siloxy or alkyl as defined above, e.g. at 2-, 3-, 4- and/or 7-positions. Preferred bridges are ethylene or —SiMe$_2$-.

The preparation of the metallocenes can be carried out according or analogously to the methods known from the literature and is within skills of a person skilled in the field. Thus for the preparation see e.g. EP-A-129 368, examples of compounds wherein the metal atom bears a —NR"$_2$ ligand see i.a. in WO-A-9856831 and WO-A-0034341. For the preparation see also e.g. in EP-A-260 130, WO-A-9728170, WO-A-9846616, WO-A-9849208, WO-A-9912981, WO-A-9919335, WO-A-9856831, WO-A-00/34341, EP-A-423 101 and EP-A-537 130.

Alternatively, in a further subgroup of the metallocene compounds, the metal bears a Cp group as defined above and additionally a η1 or η2 ligand, wherein said ligands may or may not be bridged to each other. Such compounds are described e.g. in WO-A-9613529, the contents of which are incorporated herein by reference.

Further preferred metallocenes include those of formula (I)

$$Cp"_2 M'X'_2$$

wherein each X' is halogen, $C_{1-6}$ alkyl, benzyl or hydrogen;
M' is Hf or Zr;
Cp' is a cyclopentadienyl or indenyl group optionally substituted by a $C_{1-10}$ hydrocarbyl group or groups and being optionally bridged, e.g. via an ethylene or dimethylsilyl link.

Especially preferred catalysts are bis-(n-butyl cyclopentadienyl) hafnium dibenzyl, and bis-(n-butyl cyclopentadienyl) zirconium dichloride.

Metallocene procatalysts are generally used as part of a catalyst system which also includes a catalyst activator, called also as cocatalyst. Useful activators are, among others, aluminium compounds, like aluminium alkoxy compounds. Suitable aluminium alkoxy activators are for example methylaluminoxane (MAO), hexaisobutylaluminoxane and tetraisobutylaluminoxane. In addition boron compounds (e.g. a fluoroboron compound such as triphenylpentafluoroboron or triphentylcarbenium tetraphenylpentafluoroborate (($C_6H_5)_3$B+B—($C_6F_5)_4$)) can be used as activators. The cocatalysts and activators and the preparation of such catalyst systems is well known in the field. For instance, when an aluminium alkoxy compound is used as an activator, the Al/M molar ratio of the catalyst system (Al is the aluminium from the activator and M is the transition metal from the transition metal complex) is suitable from 50 to 500 mol/mol, preferably from 100 to 400 mol/mol. Ratios below or above said ranges are also possible, but the above ranges are often the most useful.

If desired the procatalyst, procatalyst/cocatalyst mixture or a procatalyst/cocatalyst reaction product may be used in supported form (e.g. on a silica or alumina carrier), unsupported form or it may be precipitated and used as such. One feasible way for producing the catalyst system is based on the emulsion technology, wherein no external support is used, but the solid catalyst is formed from by solidification of catalyst droplets dispersed in a continuous phase. The solidification method and further feasible metallocenes are described e.g. in WO03/051934 which is incorporated herein as a reference.

It is also possible to use combinations of different activators and procatalysts. In addition additives and modifiers and the like can be used, as is known in the art.

Any catalytically active catalyst system including the procatalyst, e.g. metallocene complex, is referred herein as single site or metallocene catalyst (system). Processes for making these polymers are well known.

It is especially preferred if the MDPE/LDPE combination described herein is crosslinked. A crosslinked polymer composition of the insulation layer according to this aspect of the invention may have a conductivity of less than 3.0 fS/m (as measured by the DC conductivity method A herein defined).

It is especially preferred if the LLDPE/LDPE combination described herein is not crosslinked.

Preferably the SSC PE is the MDPE.

Polymer Composition

The polymer composition of use in the insulation layer of the invention comprises components (I) and (II). In a more preferred embodiment, the polymer composition preferably consists essentially of the components (I) and (II). The term consists essentially of implies that there are no other polymer components present in the composition. It will be appreciated that the polymer composition may contain standard polymer additives discussed in more detail below. The term consists essentially of is used to exclude the presence of other polymer components but is intended to allow the option of additives being present.

Conductivity

In all embodiments of the invention it is preferred if the conductivity of the polymer composition or the conductivity of the insulation layer is 10.0 fS/m or less, such as 6.0 fS/m or less, especially 5.0 fS/m or less when determined using method A. In some embodiments, the conductivity of the composition or the conductivity of the insulation layer may be 2.0 fS/m or less, such as 1.0 fS/m or less when determined using method A (30 kV, 70° C.).

In all embodiments of the invention it is preferred if the conductivity of the composition or the conductivity of the insulation layer is 20.0 fS/m or less, such as 15.0 fS/m or less, especially 10.0 fS/m or less. These values are measured according to determination method C (80 kV, 70° C.).

In all embodiments of the invention it is preferred if the conductivity of the composition or the conductivity of the insulation layer is 10.0 fS/m or less, such as 5.0 fS/m or less, especially 4.0 fS/m or less. These values are measured according to determination method D (60 kV, 70° C.).

The composition of LDPE and MDPE/LLDPE as described herein may have a conductivity of S/cm of less than $1.0 \times 10^{-14}$, such as when determined according to DC method B, such as $9.0 \times 10^{-15}$ S/cm or less, especially $5.0 \times 10^{-15}$ S/cm or less, such as $1.0 \times 10^{-16}$ S/cm or less or $5.0 \times 10^{-16}$ or less. In some embodiments, the conductivity may be $9.0 \times 10^{-17}$ S/cm or less.

In one embodiment, the LDPE of the invention is combined with an UHMWPE. When the LDPE is blended with UHMWPE, the resulting blend has markedly improved electrical conductivity with respect to the pure LDPE at low UHMWPE loadings, indicating hindrance of the charge carriers mobility due to locally more regular morphology of UHMWPE.

The composition of LDPE and UHMWPE as described herein may have a conductivity of S/cm of less than $1 \times 10^{-14}$, such as when determined according to DC method B.

Cables

The cable of the invention is preferably a DC cable. A DC power cable is defined to be a DC cable transferring energy operating at any voltage level, typically operating at voltages higher than 1 kV. The DC power cable can be a low voltage (LV), a medium voltage (MV), a high voltage (HV) or an extra high voltage (EHV) DC cable, which terms, as well known, indicate the level of operating voltage. The polymer is even more preferable used in the insulation layer for a DC power cable operating at voltages higher than 36 kV, such as a HV DC cable. For HV DC cables the operating voltage is defined herein as the electric voltage between ground and the conductor of the high voltage cable.

Preferably the HV DC power cable of the invention is one operating at voltages of 40 kV or higher, even at voltages of 50 kV or higher. More preferably, the HV DC power cable operates at voltages of 60 kV or higher. The invention is also highly feasible in very demanding cable applications and further cables of the invention are HV DC power cable operating at voltages higher than 70 kV. Voltages of 100 kV or more are targeted, such as 200 kV or more, more preferably 300 KV or more, especially 400 kV or more, more especially 500 kV or more. Voltages of 640 KV or more, such as 700 kV are also envisaged. The upper limit is not limited. The practical upper limit can be up to 1500 kV such as up to 1100 kV. The cables of the invention operate well therefore in demanding extra HV DC power cable applications operating 400 to 850 kV, such as 650 to 850 kV.

A cable, such as a DC cable, comprises an inner semiconductive layer comprising a first semiconductive composition, an insulation layer comprising the polymer composition of the invention and an outer semiconductive layer comprising a second semiconductive composition, in that order.

The polymer composition of the invention is used in the insulation layer of the cable. Ideally, the insulation layer comprises at least 95 wt %, such as at least 98 wt % of the polymer composition of the invention, such as at least 99 wt %, e.g. consists of the polymer composition. It is preferred therefore if the polymer composition of the invention is the only non-additive component used in the insulation layer of the cables of the invention. Thus, it is preferred if the insulation layer consists essentially of the composition of the invention. The term consists essentially of is used herein to mean that the only polymer composition present is that defined. It will be appreciated that the insulation layer may contain standard polymer additives such as scorch retarders, water tree retarders, antioxidants and so on. These are not excluded by the term "consists essentially of". Note also that these additives may be added as part of a masterbatch and hence carried on a polymer carrier. The use of masterbatch additives is not excluded by the term consists essentially of.

The insulation layer can have a beneficial low electrical conductivity when it is crosslinked with a crosslinking agent. The insulation layer of the cables of the invention can thus optionally be crosslinkable.

The term crosslinkable means that the insulation layer can be crosslinked using a crosslinking agent before use. The insulation layer will need to comprise a crosslinking agent in order to be crosslinkable, typically a free radical generating agent. The crosslinked polymer composition has a typical network, i.a. interpolymer crosslinks (bridges), as well known in the field.

If the insulation layer is crosslinked, any parameter of the insulation layer other than conductivity is ideally measured before the crosslinking unless otherwise indicated. In embodiments, wherein the insulation layer comprises no crosslinking agent, the electrical conductivity as described under the "Determination method" is measured from a sample of polymer composition forming the insulation layer which is non-crosslinked (i.e. does not contain a crosslinking agent and has not been crosslinked with a crosslinking agent). In embodiments, wherein the insulation layer is crosslinked with a crosslinking agent, then the electrical conductivity is measured from a sample of the crosslinked polymer composition (i.e. a sample of the polymer composition is first crosslinked with the crosslinking agent initially present and then the electrical conductivity is measured from the obtained crosslinked sample). The conductivity measurement from a non-crosslinked or a crosslinked polymer composition sample is described under "Determination Methods".

The amount of the crosslinking agent used, if present, can vary, preferably within the ranges given below. Preferably a peroxide is used in an amount of 0 to 110 mmol —O—O—/kg polymer composition of the insulation layer, preferably 0 to 90 mmol —O—O—/kg polymer composition (corresponds 0 to 2.4 wt % of dicumyl peroxide based on the polymer composition), preferably of 0 to 37 mmol —O—O—/kg polymer composition, preferably of 0 to 35 mmol —O—O—/kg polymer composition, preferably of 0 to 34 mmol —O—O—/kg polymer composition, preferably of 0 to 33 mmol —O—O—/kg polymer composition, more preferably from 0 to 30 mmol —O—O—/kg polymer composition, more preferably from 0 to 20 mmol —O—O—/kg polymer composition, more preferably from 0 to 10.0 mmol —O—O—/kg polymer composition, more preferably from 0 to 7.0 mmol —O—O—/kg polymer composition, more preferably less than 5.0 mmol —O—O—/kg polymer composition, most preferably the polymer composition comprises no crosslinking agent (=0 wt % of added crosslinking agent). The insulation layer is thus ideally free of byproducts of the decomposition of the peroxide.

The lower limit of the crosslinking agent, if present, is not limited and can be at least 0.1 mmol —O—O—/kg polymer composition in the insulation layer, preferably at least 0.5 mmol —O—O—/kg polymer composition, more preferably at least 5.0 mmol —O—O—/kg polymer composition. The lower peroxide content can shorten the required degassing step of the produced and crosslinked cable, if desired.

The unit "mmol —O—O—/kg polymer composition" means herein the content (mmol) of peroxide functional groups per kg polymer composition, when measured from the polymer composition prior to crosslinking. For instance the 35 mmol —O—O—/kg polymer composition corresponds to 0.95 wt % of the well-known dicumyl peroxide based on the total amount (100 wt %) of the polymer composition.

Such polymer composition may comprise one type of peroxide or two or more different types of peroxide, in which case the amount (in mmol) of —O—O—/kg polymer composition, as defined above, below or in claims, is the sum of the amount of —O—O—/kg polymer composition of each peroxide type. As non-limiting examples of suitable organic peroxides, di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl) peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof, can be mentioned. Preferably, the peroxide is selected from 2,5-di(tert-butylperoxy)-2,5-dimethylhexane, di(tert-butylperoxyisopropyl)benzene, dicumylperoxide, tert-butylcumylperoxide, di(tert-butyl) peroxide, or mixtures thereof. Most preferably, the peroxide is dicumylperoxide.

Where the blend component is MDPE it is preferred if the insulation layer is crosslinked.

Where the blend component is UHMWPE it is preferred if the insulation layer is not crosslinked.

Where the insulation layer is not crosslinked, it is preferred that the insulation layer comprises no crosslinking agent. The prior art drawbacks relating to the use of a crosslinking agent in cable layer can therefore be avoided. Naturally, the non crosslinked embodiment also simplifies the cable production process. As no crosslinking agent is required, the raw material costs are lower. Also, it is generally required to degas a cross-linked cable layer to remove the by-products of the peroxide after crosslinking. Where the material is not crosslinked, no such degassing step is required.

The insulation layer may contain, in addition to the LDPE blend and the optional peroxide, further component(s) such as additives (such as any of antioxidant(s), scorch retarder(s) (SR), crosslinking booster(s), stabiliser(s), processing aid(s), flame retardant additive(s), water tree retardant additive(s), acid or ion scavenger(s), inorganic filler(s) and voltage stabilizer(s), as known in the polymer field.

The insulation layer may therefore comprise conventionally used additive(s) for W&C applications, such as one or more antioxidant(s) and optionally one or more scorch retarder(s), preferably at least one or more antioxidant(s). The used amounts of additives are conventional and well known to a skilled person, e.g. 0.1 to 1.0 wt %.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

Preferably, the insulation layer does not comprise a carbon black. Also preferably, the insulation layer does not comprise flame retarding additive(s), e.g. a metal hydroxide containing additives in flame retarding amounts.

The cable of the invention also contains inner and outer semiconductive layers. These can be made of any conventional material suitable for use in these layers. The inner and the outer semiconductive compositions can be different or identical and may comprise a polymer(s) which is preferably a polyolefin or a mixture of polyolefins and a conductive filler, preferably carbon black. Suitable polyolefin(s) are e.g. polyethylene produced in a low pressure process or a polyethylene produced in a HP process (LDPE). The carbon black can be any conventional carbon black used in the semiconductive layers of a DC power cable, preferably in the semiconductive layer of a DC power cable. Preferably the carbon black has one or more of the following properties: a) a primary particle size of at least 5 nm which is defined as the number average particle diameter according ASTM D3849-95a, dispersion procedure D b) iodine number of at least 30 mg/g according to ASTM D1510, c) oil absorption number of at least 30 ml/100 g which is measured according to ASTM D2414. Non-limiting examples of carbon blacks are e.g. acetylene carbon black, furnace carbon black and Ketjen carbon black, preferably furnace carbon black and acetylene carbon black. Preferably, the polymer composition comprises 10 to 50 wt % carbon black, based on the weight of the Semiconductive composition.

In a preferable embodiment, the outer semiconductive layer is cross-linked. In another preferred embodiment, the inner semiconductive layer is preferably non-crosslinked. Overall therefore it is preferred if the inner semiconductive layer and the insulation layer remain non crosslinked where the outer semiconductive layer is crosslinked. A peroxide crosslinking agent can therefore be provided in the outer semiconductive layer only.

The conductor comprises one or more wires. Moreover, the cable may comprise one or more such conductors. Preferably the conductor is an electrical conductor and comprises one or more metal wires. Cu wire is preferred.

As well known the cable can optionally comprise further layers, e.g. screen(s), a jacketing layer(s), other protective layer(s) or any combinations thereof.

Cable Manufacture

The invention also provides a process for producing a cable comprising the steps of applying on one or more conductors, preferably by (co) extrusion, an inner semiconductive layer, an insulation layer and an outer semiconductive layer, in that order, wherein the insulation layer comprises a blend as described herein. The insulation layer can be is crosslinked or not crosslinked.

The process may optionally comprise the steps of crosslinking one or both of the inner semiconductive layer or outer semiconductive layer, without crosslinking the insulation layer. Preferably, the outer semiconductive layer is crosslinked, without crosslinking the insulation layer. Also preferably, the inner semiconductive layer is not crosslinked. Thus, it is preferred if the semi-conductive layer comprises a peroxide which enables the crosslinking of the semiconductive composition.

More preferably, a cable is produced, wherein the process comprises the steps of (a)—providing and mixing, preferably melt mixing in an extruder, an optionally crosslinkable first semiconductive composition comprising a polymer, a carbon black and optionally further component(s) for the inner semiconductive layer, providing and mixing, preferably melt mixing in an extruder, optionally crosslinkable low density polyethylene (LDPE) blend of the invention; and providing and mixing, preferably melt mixing in an extruder, a second semiconductive composition which is optionally crosslinkable and comprises a polymer, a carbon black and optionally further component(s) for the outer semiconductive layer, (b) applying on one or more conductors, preferably by coextrusion, a melt mix of the first semiconductive composition obtained from step (a) to form the inner semiconductive layer, a meltmix of polymer composition of the invention obtained from step (a) to form the insulation layer, and a meltmix of the second semiconductive composition obtained from step (a) to form the outer semiconductive layer, and (c) optionally crosslinking at crosslinking conditions one or both of the first semiconductive composition of the inner semiconductive layer and the second semiconductive composition of the outer semiconductive layer, of the obtained cable, and optionally crosslinking the insulation layer, more preferably without crosslinking the insulation layer.

Preferably in step (c) the second semiconductive polymer composition of the outer semiconductive layer is crosslinked, more preferably crosslinked without crosslinking the insulation layer. Also preferably, the second semiconductive polymer composition of the outer semiconductive layer is crosslinked, without crosslinking the insulation layer or the first semiconductive composition of the inner semiconductive layer.

Melt mixing means mixing above the melting point of at least the major polymer component(s) of the obtained mixture and is carried out for example, without limiting to, in a temperature of at least 15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer.

As well known, the polymer of the invention and the optional and preferred first and second semiconductive compositions can be produced before or during the cable production process.

Preferably, the polymers required to manufacture the cable of the invention are provided to the cable production process in form of powder, grain or pellets. Pellets mean herein generally any polymer product which is formed from reactor-made polymer (obtained directly from the reactor) by post-reactor modification to a solid polymer particles.

The (melt) mixing step (a) of the provided polymer composition of the invention and of the preferable first and second semiconductive compositions is preferably carried out in a cable extruder. The step a) of the cable production process may optionally comprise a separate mixing step, e.g. in a mixer arranged in connection and preceding the cable extruder of the cable production line. Mixing in the preceding separate mixer can be carried out by mixing with or without external heating (heating with an external source) of the component(s).

Any crosslinking agent can be added before the cable production process or during the (melt) mixing step (a). For instance, and preferably, the crosslinking agent and also the optional further component(s), such as additive(s), can already be present in the polymers used. The crosslinking agent is added, preferably impregnated, onto the solid polymer particles, preferably pellets.

It is preferred that the melt mix of the polymer composition obtained from (melt)mixing step (a) consists of the polyolefin (a) and optionally the second polyolefin (b), if present, of the invention as the sole polymer component(s). The optional and preferable additive(s) can be added to polymer composition as such or as a mixture with a carrier polymer, i.e. in a form of so-called master batch.

The optional crosslinking can be carried out at increased temperature which is chosen, as well known, depending on the type of crosslinking agent. For instance temperatures above 150° C., such as from 160 to 350° C., are typical, however without limiting thereto.

The processing temperatures and devices are well known in the art, e.g. conventional mixers and extruders, such as single or twin screw extruders, are suitable for the process of the invention.

The advantages of the most preferred embodiment of having the inner semiconductive layer and the insulation layer non-crosslinked in combination with an outer semiconductive layer which is crosslinked include:

Optimal electrical performance of the insulation system of the HV DC cable,

The connection of cables is very feasible due to non-crosslinked thermoplastic insulation composition, No need to wait and allow the heat to transfer through the insulation and inner semiconductive layers, since not crosslinked. The overall production efficiency is improved, especially in HV applications with thick insulation layer, since the inner semiconductive layer and the insulation layer need not to be crosslinked. Crosslinking of inner and outer semiconductive and insulation layers require typically at least 1 hour, while crosslinking of only the outer semiconductive layer takes less than 8 minutes, Robust high speed extrusion possible leading to longer stable production periods at higher extrusion speed and quality due to no risk to scorching (undesired premature crosslinking) in the inner semiconductive and insulation layers, Degassing step can be reduced, and thus accelerate the overall cable production process, since any undesired by-products, i.e. decomposition products, formed from the crosslinking agent, are easier to remove, i.e. degas, only from the outer layer, The crosslinked outer semiconductive layer is mechanically unexpectedly sufficient to protect the insulation layer from mechanical and thermal crack initiation, expressed as TSCR (Thermal stress cracking).

The thickness of the insulation layer of the cable, more preferably of the DC power cable such as HV DC power cable, is typically 2 mm or more, preferably at least 3 mm, preferably of at least 5 to 100 mm, more preferably from 5 to 50 mm, and conventionally 5 to 40 mm, e.g. 5 to 35 mm, when measured from a cross section of the insulation layer of the cable.

The thickness of the inner and outer semiconductive layers is typically less than that of the insulation layer, and in HV DC power cables can be e.g. more than 0.1 mm, such as from 0.3 up to 20 mm, 0.3 to 10 of inner semiconductive and outer semiconductive layer. The thickness of the inner semiconductive layer is preferably 0.3-5.0 mm, preferably 0.5-3.0 mm, preferably 0.8-2.0 mm. The thickness of the outer semiconductive layer is preferably from 0.3 to 10 mm, such as 0.3 to 5 mm, preferably 0.5 to 3.0 mm, preferably 0.8-3.0 mm. It is evident for and within the skills of a skilled person that the thickness of the layers of the DC cable depends on the intended voltage level of the end application cable and can be chosen accordingly.

The most interesting HVDC cables of the invention may have an insulation layer thickness of 20 mm or more, such as 20 to 40 mm. Service voltages above 320 kV are possible. Transmission capacities of above 1000 MW are also targeted.

The preferable embodiments of the polymer composition of the invention can be combined with each other to further define the preferable embodiments of the invention.

The invention will now be defined with reference to the following non limiting examples and figures.

Figure 3:
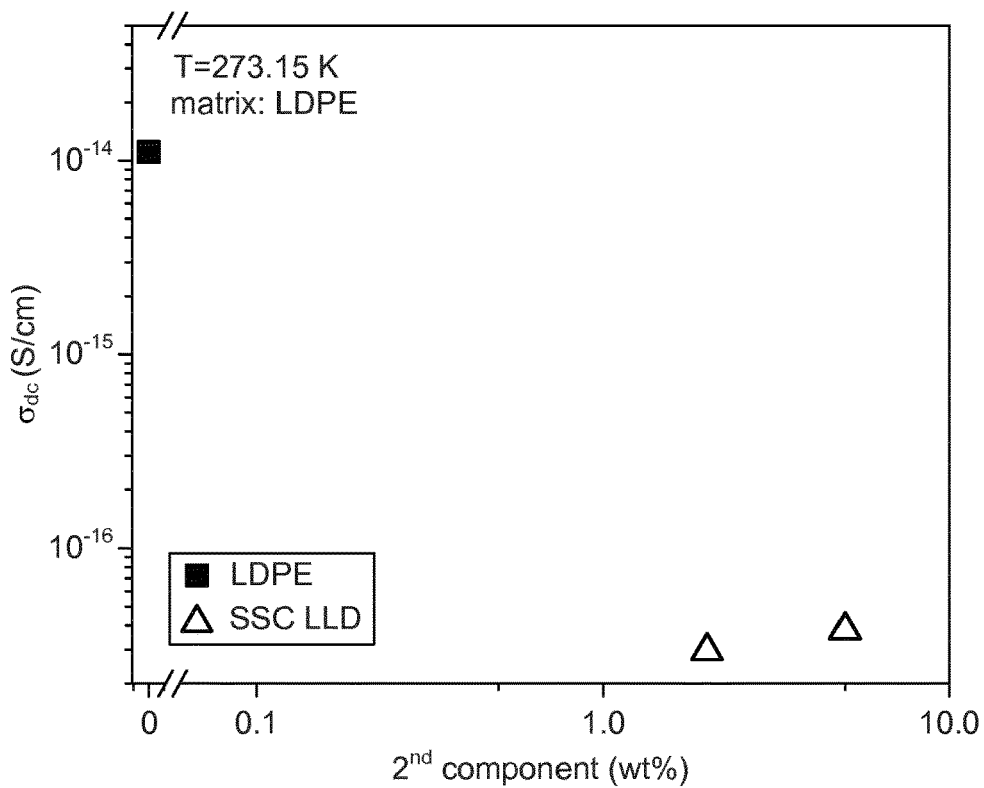

In FIG. 3 a visual representation of the results shown on Table 5 can be seen.

From these results we can see that the DC conductivity drops by ~2 orders of magnitude when the pure LDPE is modified.

Determination Methods

Unless otherwise stated in the description or experimental part the following methods were used for the property determinations.

Wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and at 230° C. for polypropylene. MFR may be determined at different loadings such as 2.16 kg ($MFR_2$) or 21.6 kg ($MFR_{21}$).

Molecular Weight

Mz, Mw, Mn, and MWD are measured by Gel Permeation Chromatography (GPC) according to the following method: The weight average molecular weight Mw and the molecular weight distribution (MWD=Mw/Mn wherein Mn is the number average molecular weight and Mw is the weight average molecular weight; Mz is the z-average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 µL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

Comonomer Contents a) Comonomer Content in Random Copolymer of Polypropylene:

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy. The calibration procedure based on results obtained from quantitative $^{13}$C-NMR spectroscopy was undertaken in the conventional manner well documented in the literature.

The amount of comonomer (N) was determined as weight percent (wt %) via:

$$N=k1(A/R)+k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 cm$^{-1}$) or block-like (as in heterophasic PP copolymer) (720 cm$^{-1}$). The absorbance at 4324 cm$^{-1}$ was used as a reference band.

b) Quantification of Alpha-Olefin Content in Linear Low Density Polyethylenes and Low Density Polyethylenes by NMR Spectroscopy:

The comonomer content was determined by quantitative 13C nuclear magnetic resonance (NMR) spectroscopy after basic assignment (J. Randall JMS—Rev. Macromol. Chem. Phys., C29(2&3), 201-317 (1989). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140 C. Proton decoupled 13C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125 C, a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

c) Comonomer content of polar comonomers in low density polyethylene (1) Polymers Containing >6 wt % Polar Comonomer Units
Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 cm$^{-1}$ was divided with the peak height of polyethylene at 2020 cm$^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 cm$^{-1}$ was subtracted with the absorbance value for the base line at 2475 cm$^{-1}$ ($A_{methylacrylate}$-$A_{2475}$). Then the maximum absorbance peak for the polyethylene peak at 2660 cm$^{-1}$ was subtracted with the absorbance value for the base line at 2475 cm$^{-1}$ ($A_{2660}$-$A_{2475}$). The ratio between ($A_{methylacrylate}$-$A_{2475}$) and ($A_{2660}$-$A_{2475}$) was then calculated in the conventional manner which is well documented in the literature.

The weight-% can be converted to mol-% by calculation. It is well documented in the literature.

Quantification of copolymer content in polymers by NMR spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ ($A_{polar\ comonomer}$-$A_{1850}$). Then the maximum absorbance peak for polyethylene peak at 2660 cm$^{-1}$ was subtracted with the absorbance value for the base line at 1850 cm$^{-1}$ ($A_{2660}$-$A_{1850}$). The ratio between ($A_{comonomer}$-$A_{1850}$) and ($A_{2660}$-$A_{1850}$) was then calculated. The NMR spectroscopy calibration procedure was undertaken in the conventional manner which is well documented in the literature, as described above under method 1).

The weight-% can be converted to mol-% by calculation. It is well documented in the literature.

Below is exemplified how polar comonomer content obtained from the above method (1) or (2), depending on the amount thereof, can be converted to micromol or mmol per g polar comonomer as used in the definitions in the text and claims:

The millimoles (mmol) and the micro mole calculations have been done as described below.

For example, if 1 g of the poly(ethylene-co-butylacrylate) polymer, which contains 20 wt % butylacrylate, then this material contains 0.20/$M_{butylacrylate}$ (128 g/mol)=1.56×10$^{-3}$ mol. (=1563 micromoles).

The content of polar comonomer units in the polar copolymer $C_{polar\ comonomer}$ is expressed in mmol/g (copolymer). For example, a polar poly(ethylene-co-butylacrylate) polymer which contains 20 wt. % butyl acrylate comonomer units has a $C_{polar\ comonomer}$ of 1.56 mmol/g. The used molecular weights are: $M_{butylacrylate}$=128 g/mole, $M_{ethylacrylate}$=100 g/mole, $M_{methylacrylate}$=86 g/mole).

Density

Low density polyethylene (LDPE): The density was measured according to ISO 1183-2.

The sample preparation was executed according to ISO 1872-2 Table 3 Q (compression moulding).

Low pressure process polyethylene: Density of the polymer was measured according to ISO 1183/1872-2B.

Method for Determination of the Amount of Double Bonds in the Polymer Composition or in the Polymer A) Quantification of the Amount of Carbon-Carbon Double Bonds by IR Spectroscopy Quantitative infrared (IR) spectroscopy was used to quantify the amount of carbon-carbon doubles (C=C). Calibration was achieved by prior determination of the molar extinction coefficient of the C=C functional groups in representative low molecular weight model compounds of known structure.

The amount of each of these groups (N) was determined as number of carbon-carbon double bonds per thousand total carbon atoms (C=C/1000C) via:

$$N = (A \times 14)/(E \times L \times D)$$

were A is the maximum absorbance defined as peak height, E the molar extinction coefficient of the group in question ($l \cdot mol^{-1} \cdot mm^{-1}$), L the film thickness (mm) and D the density of the material ($g \cdot cm^{-1}$).

The total amount of C=C bonds per thousand total carbon atoms can be calculated through summation of N for the individual C=C containing components.

For polyethylene samples solid-state infrared spectra were recorded using a FTIR spectrometer (Perkin Elmer 2000) on compression moulded thin (0.5-1.0 mm) films at a resolution of 4 cm$^{-1}$ and analysed in absorption mode.

1) Polymer Compositions Comprising Polyethylene Homopolymers and Copolymers, Except Polyethylene Copolymers with >0.4 wt % Polar Comonomer For polyethylenes three types of C=C containing functional groups were quantified, each with a characteristic absorption and each calibrated to a different model compound resulting in individual extinction coefficients:

vinyl (R—H=CH2) via 910 cm$^{-1}$ based on 1-decene [dec-1-ene] giving E=13.13 $l \cdot mol^{-1} \cdot mm^{-1}$ vinylidene (RR'C=CH2) via 888 cm$^{-1}$ based on 2-methyl-1-heptene [2-methyhept-1-ene] giving E=18.24 $l \cdot mol^{-1} \cdot mm^{-1}$ trans-vinylene (R—CH=CH—R') via 965 cm$^{-1}$ based on trans-4-decene [(E)-dec-4-ene] giving E=15.14 $l \cdot mol^{-1} \cdot mm^{-1}$ For polyethylene homopolymers or copolymers with <0.4 wt % of polar comonomer linear baseline correction was applied between approximately 980 and 840 cm$^{-1}$.

2) Polymer Compositions Comprising Polyethylene Copolymers with >0.4 wt % Polar Comonomer For polyethylene copolymers with >0.4 wt % of polar comonomer two types of C=C containing functional groups were quantified, each with a characteristic absorption and each calibrated to a different model compound resulting in individual extinction coefficients:

vinyl (R—CH=CH2) via 910 cm$^{-1}$ based on 1-decene [dec-1-ene] giving E=13.13 $l \cdot mol^{-1} \cdot mm^{-1}$ vinylidene (RR'C=CH2) via 888 cm$^{-1}$ based on 2-methyl-1-heptene [2-methyl-hept-1-ene] giving E=18.24 $l \cdot mol^{-1} \cdot mm^{-1}$

EBA:

For poly(ethylene-co-butylacrylate) (EBA) systems linear baseline correction was applied between approximately 920 and 870 cm$^{-1}$.

EMA:

For poly(ethylene-co-methylacrylate) (EMA) systems linear baseline correction was applied between approximately 930 and 870 cm$^{-1}$.

3) Polymer Compositions Comprising Unsaturated Low Molecular Weight Molecules

For systems containing low molecular weight C=C containing species direct calibration using the molar extinction coefficient of the C=C absorption in the low molecular weight species itself was undertaken.

B) Quantification of Molar Extinction Coefficients by IR Spectroscopy

The molar extinction coefficients were determined according to the procedure given in ASTM D3124-98 and ASTM D6248-98. Solution-state infrared spectra were recorded using a FTIR spectrometer (Perkin Elmer 2000) equipped with a 0.1 mm path length liquid cell at a resolution of 4 cm$^{-1}$.

The molar extinction coefficient (E) was determined as $l \cdot mol^{-1} \cdot mm^{-1}$ via:

$$E = A/(C \times L)$$

where A is the maximum absorbance defined as peak height, C the concentration ($mol \cdot l^{-1}$) and L the cell thickness (mm). At least three 0.18 $mol \cdot l^{-1}$ solutions in carbondisulphide (CS$_2$) were used and the mean value of the molar extinction coefficient determined.

DC Conductivity Methods

Method A

The plaques are compression moulded from pellets of the test polymer composition. The final plaques have a thickness of 1 mm and size of 200×200 mm. The conductivity measurement can be performed using a test polymer composition which does not comprise or comprises the optional crosslinking agent. In case of no crosslinking agent, the conductivity is measured from a non-crosslinked plaque sample using the below procedure. If the test polymer composition comprises the crosslinking agent, then the crosslinking occurs during the preparation of the plaque samples, whereby the conductivity is then measured according to the below procedure from the resulting crosslinked plaque sample. Crosslinking agent, if present in the polymer composition prior to crosslinking, is preferably a peroxide, as herein.

The plaques are press-moulded at 130° C. for 12 min while the pressure is gradually increased from 2 to 20 MPa. Thereafter the temperature is increased and reaches 180° C. after 5 min. The temperature is then kept constant at 180° C. for 15 min during which the plaque becomes fully crosslinked by means of the peroxide, if present in the test polymer composition. Finally the temperature is decreased using the cooling rate 15° C./min until room temperature is reached when the pressure is released. The plaques are immediately after the pressure release wrapped in metallic foil in order to prevent loss of volatile substances.

If the plaque is to be degassed (i.e. if it is crosslinked) it is placed in a ventilated oven at atmospheric pressure for 24 h at 70° C. Thereafter the plaque is again wrapped in metallic foil in order to prevent further exchange of volatile substances between the plaque and the surrounding.

A high voltage source is connected to the upper electrode, to apply voltage over the test sample. The resulting current through the sample is measured with an electrometer. The measurement cell is a three electrodes system with brass electrodes. The brass electrodes are equipped with heating pipes connected to a heating circulator, to facilitate measurements at elevated temperature and provide uniform temperature of the test sample. The diameter of the measurement electrode is 100 mm. Silicone rubber skirts are placed between the brass electrode edges and the test sample, to avoid flashovers from the round edges of the electrodes.

The applied voltage was 30 kV DC meaning a mean electric field of 30 kV/mm. The temperature was 70° C. The current through the plaque was logged throughout the whole experiments lasting for 24 hours. The current after 24 hours was used to calculate the conductivity of the insulation.

This method and a schematic picture of the measurement setup for the conductivity measurements has been thoroughly described in a publication presented at the Nordic Insulation Symposium 2009 (Nord-IS 09), Gothenburg, Sweden, Jun. 15-17, 2009, page 55-58: Olsson et al, "Experimental determination of DC conductivity for XLPE insulation".

DC Conductivity Method B (Values in S/cm)

Broadband Dielectric Spectroscopy (BDS)

Samples (40×100 mm) were made by hot pressing at 250° C. and 100 kN press force. Spacers with a thickness of 0.1 mm were used to control thickness. Disk-shaped samples were then cut out of the plaques.

All measurements were performed on disk-shaped samples with 40 mm diameter and ~0.1 mm thickness. The conductivity measurements were obtained by the use of dielectric spectrometer.

Broadband Dielectric Spectroscopy (BDS) was performed using a Novocontrol alpha spectrometer in a frequency range of $10^{-2}$ to $10^7$ Hz, at different temperatures in the range 253-383K with an error of ±0.1K, at atmospheric pressure and under nitrogen atmospher.

For selected temperatures frequency scans were also performed to investigate the local and ion dynamics. The sample cell consisted of two silver-coated electrodes 40 mm in diameter and the sample with a thickness of about 0.1 mm. The complex dielectric permittivity $\varepsilon^* = \varepsilon' - i\varepsilon''$, where $\varepsilon'$ ist he real and $\varepsilon''$ is the imaginary part, is generally a function of frequency, $\omega$, temperature T, and pressure $P^1$, although here only the frequency and temperature dependencies have been investigated. The complex dielectric conductivity $\sigma^*$ can be also calculated from the complex dielectric function $\varepsilon^*$ as $\sigma^* = i\omega\varepsilon_f\varepsilon^*$, ($\varepsilon_f$ is the permittivity of free space, 8.854 pF/m) where conductivity can also be analysed in a real and an imaginary part: $\sigma^* = \sigma' + i!''$. This means the conductivity data are effectively an alternative representation of the permittivity, nevertheless focusing on different features of the dielectric behaviour as we will discuss below. The analysis has been made using the empirical equation of Havriliak and Negami[2]

$$\frac{\varepsilon^*(\omega, T, P) - \varepsilon(T, P)}{\Delta\varepsilon(T, P)} = \frac{1}{[1 + (i\omega\tau_{HN}(T, P))a]^\gamma}$$

where $\tau_{HN}(T,P)$ is the characteristic relaxation time in this equation, $\Delta\varepsilon(T,P)$ is the relaxation strength of the process under investigation, $\varepsilon_\infty$ is the dielectric permittivity at the limit of high frequencies, and $\alpha$, $\gamma$ ($0<\alpha$, $\alpha\gamma\leq1$) describe, respectively, the symmetrical and asymmetrical broadening of the distribution of relaxation times. The relaxation times at maximum loss ($\tau_{max}$) presented herein have been analytically obtained by fitting the relaxation spectra with the Havriliak-Negami (HN) equation as follows:

$$\tau_{max} = \tau_{HN}\left[\frac{\sin\left(\frac{\pi\alpha}{2(1+\gamma)}\right)}{\sin\left(\frac{\pi\alpha\gamma}{2(1+\gamma)}\right)}\right]^{-1/\alpha}$$

DC Conductivity Method C

Method A is repeated but the applied voltage was 80 kV DC meaning a mean electric field of 80 kV/mm.

DC Conductivity Method D

Method A is repeated but the applied voltage was 60 kV DC meaning a mean electric field of 60 kV/mm.

Experimental Part

The following materials are used in the examples:

LDPE1, an LDPE homopolymer of density 922 kg/m$^3$ and $MFR_2$ of 2.0 g/10 min.

LDPE2—LDPE homopolymer having the properties of table 1:

TABLE 1

| Polymer properties | |
| --- | --- |
| Base Resin Properties | LDPE |
| $MFR_2$, 190° C. [g/10 min] | 0.3 |
| Density [kg/m$^3$] | 930 |
| Tensile modulus | 350 MPa |
| Flex Modulus | 330 MPa |

UHMWPE1 Mw=4.6×10$^6$ Da viscosity number 2200 (ISO1628-3).

The UHMWPE polymer is a homopolymer.

MDPE1—a single site copolymer of ethylene with of density 930 kg/m$^3$ and $MFR_2$ of 2.2 g/10 min.

MDPE2—a single site copolymer of ethylene with of density 935 kg/m$^3$ and $MFR_2$ of 1.2 g/10 min.

SSC LLDPE—a single site copolymer of ethylene with of density 918 kg/m$^3$ and $MFR_2$ of 1.5 g/10 min.

Compounding of the polymer compositions: Each polymer component of a test polymer composition were added as separate pellets to a pilot scale extruder (Prism TSE 24TC) together with additives, if not present in the pellets, other than the crosslinking agent. The obtained mixture was meltmixed in conditions given in the below table and extruded to pellets in a conventional manner.

| Set Values Temperatures [° C.] | | | | | | Extruder | | | |
| --- | --- | --- | --- | --- | --- | --- | --- | --- | --- |
| Zone 1 | Zone 2 | Zone 3 | Zone 4 | Zone 5 | Zone 6 | rpm | Output [kg/h] | Pressure [bar] | Filter [mesh] |
| 80 | 155 | 165 | 175 | 175 | 180 | 225 | 7.5 | 60 | 325 |

The crosslinking agent, herein peroxide, if present, was added on to the pellets and the resulting pellets were used for the experimental part. CrosslinkiNg conditions are defined in the conductivity tests.

Example 1

Crosslinked Blends

The following blends are prepared:

TABLE 3

|  | CE1 | IE1 | IE2 |
|---|---|---|---|
| LDPE1 [wt %] | 99.92 | 84.92 | 84.92 |
| Santonox R [wt %]* | 0.08 | 0.08 | 0.08 |
| MDPE1 [wT %] | 0 | 15 | 0 |
| MDPE2 [wt %] | 0 | 0 | 15 |
| Peroxide - DCP [wt %] | +0.55 | +0.55 | +0.55 |

*antioxidant
DCP dicumyl peroxide

Figure 1:
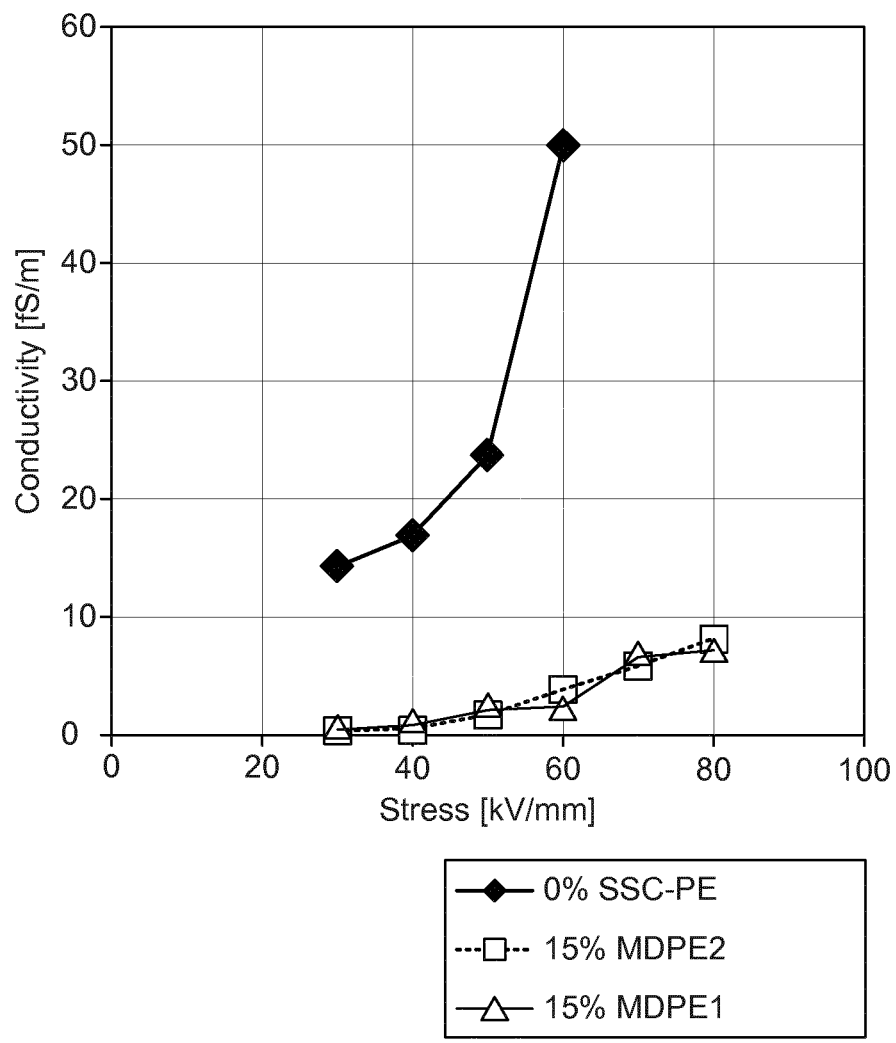
FIG. 1 shows the Conductivity vs. stress at 70° C. for XLPE and SSC-MDPE modified XLPEs.

Results are shown in FIG. 1 and summarised in table 4. As can be seen, both MDPE modified crosslinked blends exhibit extremely low stress dependence, with conductivity below 10 fS/m at 80 kV/mm. For comparison, the material with 0% MDPE exhibits more than 10 times higher conductivity

TABLE 4

| Material | Wt % SSC-MDPE | Conductivity [fS/m]$^2$ (30 kV/mm) | Conductivity [fS/m]$^4$ (60 kV/mm) | Conductivity [fS/m]$^3$ (80 kV/mm) |
|---|---|---|---|---|
| CE1 | 0 | 14.2 | 49.6 |  |
| IE1 | 15 | 0.2 | 3.8 | 8.1 |
| IE2 | 15 | 0.3 | 2.5 | 7.3 |

$^1$Method A (30 kV)
$^3$Method C (80 KV)
$^4$Method D (60 KV)

Example 2

Not Crosslinked

All blends were prepared on the Prism compounding unit described above.

TABLE 5

|  | CE2 | IE3 | IE4 |
|---|---|---|---|
| LDPE2 (wt %) | 100 | 98 | 95 |
| SSC LLDPE (wt %) |  | 2 | 5 |
| DC Conductivity (S/cm) method B | 1.10E-14 | 3.27E-17 | 5.12E-17 |

These results are presented in FIG. 3.

Example 3

Non Crosslinked

The mixtures in table 6 were prepared by melt mixing the components at 160° C. for 10 minutes in a Haake mini twin screw extruder followed by hot pressing at 250° C. and 100 kN press force. Film samples are 40×100 mm. Spacers with a thickness of 0.1 mm were used to control thickness. Disk-shaped samples were then cut out of the films. Spacers with a thickness of 0.1 mm was used to control thickness.

TABLE 6

|  | CE3 | IE5 |
|---|---|---|
| LDPE2 wt % | 100 | 95 |
| UHMWPE wt % |  | 5 |
| DC Conductivity (S/cm)* | 1.64E-12 | 6.11E-15 |

*(method B)

Figure 2:
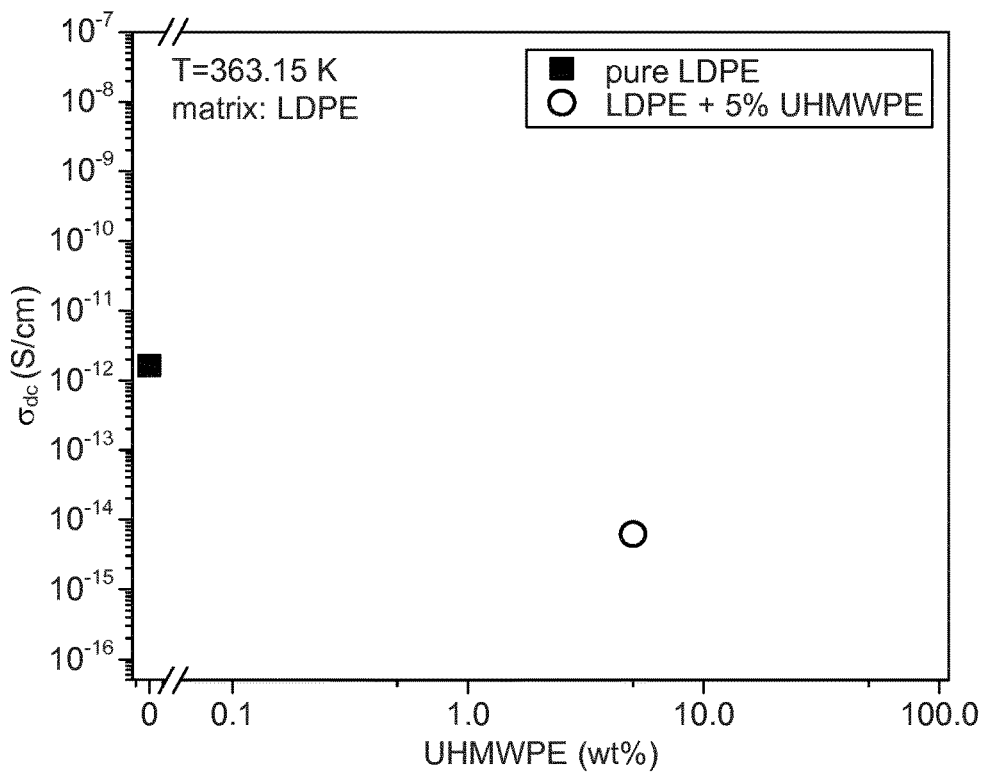
FIG. 2 shows conductivity vs UHMWPE content.

In FIG. 2 a visual representation of the results in Table 6 can be seen. From these results we can see that the DC conductivity drops by ~2 orders of magnitude when the pure LDPE is modified with UHMWPE. In this example, all measurements were performed on disk-shaped samples with 40 mm diameter and ~0.1 mm thickness.

The invention claimed is:

1. A cable comprising one or more conductors surrounded by at least an inner semiconductive layer, an insulation layer and an outer semiconductive layer, in that order, wherein said insulation layer comprises at least 90 wt % of a polymer composition, said polymer composition comprising
   (I) 80.0 to 99.9 wt % of an LDPE homopolymer or copolymer having a tensile modulus of up to 600 MPa; and
   (II) 0.1 to 20.0 wt % of:
      (i) an ultra-high molecular weight polyethylene having a Mw of at least 1,000,000; or
      (ii) a single site catalyzed medium density polyethylene (MDPE) having a density of 925 to 940 kg/m$^3$ or a single site catalyzed linear low density polyethylene (LLDPE) having a density of 910 to 925 kg/m$^3$;
   wherein the polymer composition of the insulation layer has a conductivity of 20.0 fS/m or less (determination method C (80 kV/mm, 70° C.)).

2. The cable of claim 1, wherein the polymer composition of the insulation layer has a conductivity of 10.0 fS/m or less (determination method D (60 kV/mm, 70° C.)).

3. The cable of claim 1, wherein the conductivity of the polymer composition of the insulation layer is 1.0×10$^{14}$ S/cm or less, when measured according to DC conductivity method as described under Methods B.

4. The cable of claim 1, wherein the insulation layer is not crosslinked.

5. The cable of claim 1, having a direct current (DC) power cable.

6. The cable of claim 5, wherein the direct current (DC) power cable operates at or is capable of operating at 320 kV or more.

7. The cable of claim 1, wherein the component (II) is a SSC MDPE.

8. The cable of claim 1, wherein the component (II) is MDPE and this forms 4.0 to 15.0 wt % of the polymer composition.

9. The cable of claim 1, wherein the component (II) is an LLDPE and this forms 1.5 to 6 wt % of the polymer composition.

10. The cable of claim 1, wherein the component (II) is an UBMWPE and this forms 5.0 to 10.0 wt % of the polymer composition.

11. The cable of claim 1, wherein the component (II) is the MDPE having a density of 930 to 937 kg/m$^3$ and an MFR$_2$ of 0.5 to 3.0 g/10 min.

12. A process for producing a cable comprising the steps of:
applying on one or more conductors, an inner semiconductive layer, an insulation layer and an outer semiconductive layer, in that order, wherein the insulation layer comprises a polymer composition of claim 1, and optionally crosslinking the insulation layer.

13. The cable of claim 1, wherein the conductivity of the polymer composition of the insulation layer is 15.0 fS/m or less (determination method C (80 kV/mm, 70° C.)).

14. The cable of claim 1, wherein the conductivity of the polymer composition of the insulation layer is 5.0 fS/m or less (determination method D (60 kV/mm, 70° C.)).

15. The cable of claim 1, wherein the conductivity of the polymer composition of the insulation layer is $1.0 \times 10'$ S/cm or less when measured according to DC conductivity method as described under Methods B.

16. A cable comprising one or more conductors surrounded by at least an inner semiconductive layer, a crosslinked insulation layer and an outer semiconductive layer, in that order, wherein said insulation layer comprises at least 90 wt % of a polymer composition, said polymer composition comprising
(I) 80.0 to 99.9 wt % of an LDPE homopolymer or copolymer having a tensile modulus of up to 600 MPa; and
(II) 0.1 to 20.0 wt % of a single site catalyzed medium density polyethylene (MDPE) having a density of 925 to 940 kg/m$^3$ or a single site catalyzed linear low density polyethylene (LLDPE) having a density of 910 to 925 kg/m$^3$;
wherein the polymer composition of the insulation layer has a conductivity of 20.0 fS/m or less (determination method C (80 kV/mm, 70° C.)).

17. A cable comprising one or more conductors surrounded by at least an inner semiconductive layer, an insulation layer and an outer semiconductive layer, in that order, wherein said insulation layer comprises at least 90 wt % of a polymer composition, said polymer composition comprising
(I) 80.0 to 99.9 wt % of an LDPE homopolymer or copolymer having a tensile modulus of up to 600 MPa and having a density of 927 to 940 kg/m$^3$; and
(II) 0.1 to 20.0 wt % of an ultra-high molecular weight polyethylene having a Mw of at least 1,000,000;
wherein the polymer composition of the insulation layer has a conductivity of 20.0 fS/m or less (determination method C (80 kV/mm, 70° C.)).

* * * * *